Figure 1:
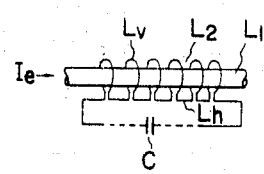

3,440,436
PARAMETRON USING HOLLOW TUBULAR
FERROMAGNETIC THIN FILM CORES
Shintaro Oshima, Musashino-shi, Tokyo-to, Tetsusaburo
Kamibayashi, Shinza-machi, Kitaadachi,gun, and Kitsutaro Amano, Sagamihara-shi, Japan, assignors to
Kokusai Denshin Denwa Kabushiki Kaisha, Tokyo-to,
Japan, a joint-stock company of Japan
Filed Apr. 12, 1966, Ser. No. 541,999
Claims priority, application Japan, Apr. 12, 1965,
40/21,210; Apr. 26, 1965, 40/24,296
Int. Cl. H03k 3/47
U.S. Cl. 307—88                 10 Claims This invention relates to parametron elements and units including a plurality of parametron elements, and more particularly to parametron elements and such units using hollow tubular ferromagnetic thin-film cores in which an informatioin magnetic field of frequency $f_0$ and an excitation magnetic field of frequency $2f_0$ are caused to orthogonally intersect each other.

There have been heretofore proposed parametron elements of the type having advantages such as small size, high operation speed, and suitability for mass production. These conventional parametron elements, however, have the disadvantage of a considerable voltage of the frequency $2f_0$ being directly induced in the resonance circuit of the parametron element. As a result of such direct induction, the generated oscillation wave has distortion, and Q of the resonance circuit is reduced. Moreover, correct phase control of the oscillation wave carried out by a small information signal is sometimes traversed, so that eciency of the information signal in the case of connection of a plurality of elements is considerably decreased. This phenomenon causes a reduction in the operation margin of elements. Another problem of operating the conventional parametron element is the trouble in which a plurality of elements are excited by long, unbalanced excitation lines, and respective lines of multiphase excitation are closely arranged or intersect one another. In this case, a large capacity of the excitation source is necessary since the impedance of each of the excitation lines is high. Moreover, the excitation magnetic field of each excitation phase is liable to leak into other excitation lines so that the operation of parametron elements excited by other excitation phases is disturbed. Excitation by such an unbalanced line has further disadvantages such as being considerably affected by external magnetic fields.

An object of this invention is to provide a parametron element substantially having no direct leakage of the excitation frequency $2f_0$ to the resonance circuit.

Another object of this invention is to provide a parametron element which has a low impedance of excitation terminals so that a stable excitation can be carried out with a relatively small capacity of excitation source.

A further object of this invention is to provide a parametron unit including a plurality of parametron elements suitable for said objects.

Said objects and other objects of this invention can be achieved by the parametron element of this invention, comprising a pair of hollow tubular thin films of high permeability material arranged in parallel, each having an easy direction of magnetization; a pair of first conductors each threaded through said hollow films; a second conductor consisting of a winding wound on said hollow film; tuning means connected to the second conductor to form a resonance circuit having a resonance frequency $f_0$; means for passing energizing alternating currents having a frequency substantially equal to $2f_0$ through the first conductors in reverse directions to each other, whereby voltages of the frequency $2f_0$ induced in the second conductor by the energizing alternating current flowing through the first conductors nullify each other in the resonance circuit; input means for applying, to the resonance circuit, at least one information signal having a frequency $f_0$ and either of opposite phase positions in accordance with input binary information; and output means for deriving, from the resonance circuit, an output signal which has a frequency $f_0$ and either of opposite phase positions in accordance with the phase position of the information signal. The parametron unit of the invention comprises a plurality of such parametron elements.

Figure 3:
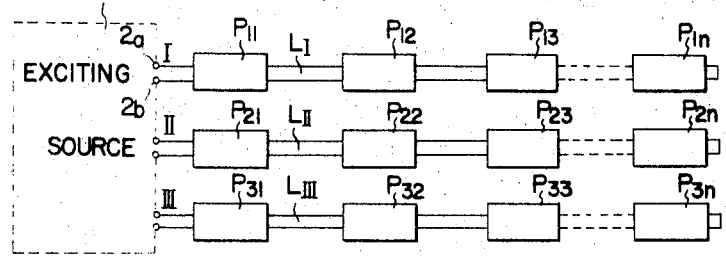
Figure 8:
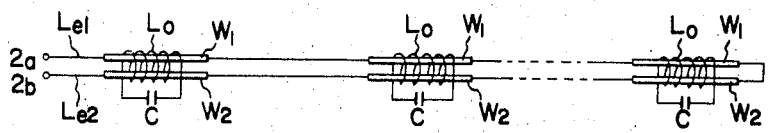
Figure 8:
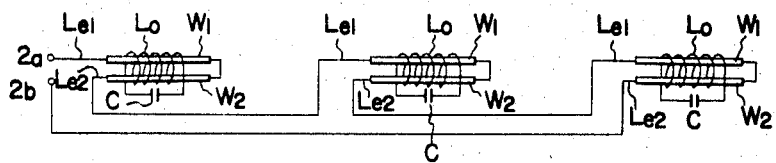
Figure 9:
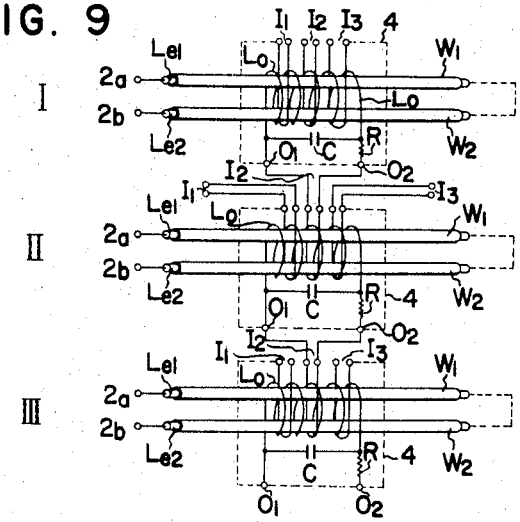
Figure 10:
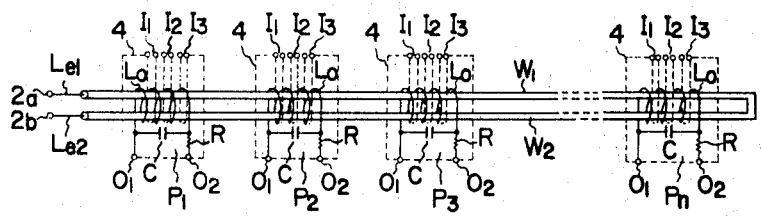
Figure 11:
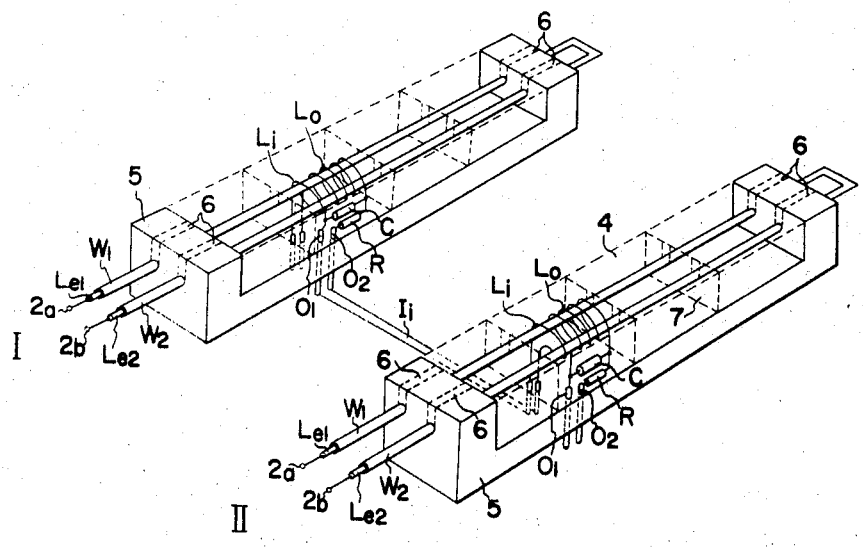

The novel features of this invention are set forth with particularity in the appended claims. This invention, however, both as to its construction and operation together with further objects and advantages thereof, may best be understood by reference to the following description, taken in connection with the accompanying drawings, in which the same or equivalent parts are designated by the same reference characters or numerals, and in which:

FIG. 1 shows an equivalent circuit for describing the principle of this invention;

FIGS. 2, 4(a), 4(b), 5(a), 5(b), 5(c), 5(d), 5(e), 5(f), 6(a), 6(b), 7(a), 7(b) and 7(c) show connection diagrams of the parametron element of this invention;

FIGS. 3, 8(a) and 8(b) show an excitation system of the parametron elements of this invention;

FIG. 9 shows a connection diagram of a plurality of parametron elements of this invention coupled to one another; and FIGS. 10 and 11 show connection diagrams of parametron units of this invention.

To make the characteristic features of the parametron element of this invention comprehensible, the principle of said direct induction of the excitation frequency $2f_0$ in the resonance circuit is first described. Referring to FIG. 1. It is assumed that a solenoid coil $L_0$ is wound on a straight conductor $L_1$, and an alternating current signal $I_e$ is applied to the conductor $L_1$. No voltage of A.C. signal $I_e$ is induced if the conductors $L_1$ and $L_2$ are orthogonally arranged to each other. In a practical winding, however, the conductor $L_1$ has equivalently an inductance component $L_v$ orthogonal to the conductor $L_1$ and an inductance component $L_h$ parallel to the conductor $L_1$. The component $L_h$ increases when the length of the wound conductor $L_2$ extends further. While no excitation signal at all is induced in the component $L_v$, it is induced in the component $L_h$ because of magnetic fluxes caused by the excitation signal $I_e$ intersecting the component $L_h$. The practical winding ($L_2$) has essentially the component $L_h$, so that considerable induction of the excitation signal in the inductor $L_2$ is unavoidable. In the conventional parametron element of this type, the wound conductor $L_2$ forms the resonance circuit together with a capacitor C. Accordingly, a considerable voltage of the excitation signal is necessarily induced in the resonance circuit. It is a characteristic feature of this invention to cancel out such induced voltages in the resonance circuit.

Referring to FIG. 1, the construction of an embodiment of this invention will be described. The element shown in FIG. 1 comprises a pair of hollow tubular thin films $W_1$ and $W_2$, a pair of first conductors $L_{e1}$ and $L_{e2}$, a second conductor $L_0$, a tuning capacitor C, energizing terminals $2a$ and $2b$, three pairs of input terminals $I_1$, $I_2$ and $I_3$, and output terminals $O_1$ and $O_2$. The films $W_1$ and $W_2$ are of high permeability material, such as a Permalloy, each having an easy direction of magnetization, and are arranged in parallel as shown. Each of the first conductors $L_{e1}$ and $L_{e2}$ is threaded through each of the hollow films $W_1$ and $W_2$. In actual construction, the films $W_1$ and $W_2$ can be deposited on the conductors $L_{e1}$ and $L_{e2}$ by electrical plating or evaporative deposition. In other cases, the films $W_1$ and $W_2$ can be deposited on hollow tubular substrate, such as glass, through which the conductor $L_{e1}$ or $L_{e2}$ are threaded. The second conductor $L_0$ consists of a winding wound on said hollow films $W_1$ and $W_2$. The tuning capacitor C is connected in parallel to the second conductor $L_0$, thereby forming a resonance circuit which has a resonance frequency $f_0$. Through the excitation terminals $2a$ and $2b$, an alternating current $I_{2f}$ having a frequency substantially equal to $2f_0$ and an appropriate D.C. bias current $I_{DC}$ are caused to flow, as energizing signals, through the first conductors $L_{e1}$ and $L_{e2}$ in mutually opposite directions as shown by arrows. The input terminals $I_1$, $I_2$ and $I_3$ are arranged, respectively, at the terminals of input coils wound concurrently on the films $W_1$ and $W_2$. These input means are employed for applying, to the resonance circuit, at least one information signal having the frequency $f_0$ and either of opposite phase position in accordance with input binary information. When the energizing signal $(I_{2f}+I_{DC})$ is applied to the excitation terminals $2a$ and $2b$, the resonance circuit ($L_0$ and C) is parametrically excited and generates a parametrical oscillation of the frequency $f_0$ which has either of opposite phase positions in accordance with the phase position of the information signal applied from the input means. This generated oscillation signal can be derived, from the resonance circuit, through the output terminals as an output signal of the parametron element.

Figure 2:
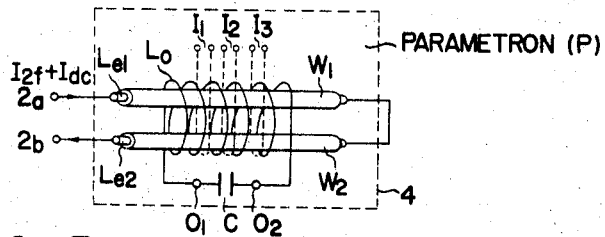

In this example, voltages of the frequency $2f_0$ are induced, by the conductors $L_{e1}$ and $L_{e2}$, in the conductor $L_0$; but they have opposite phase positions relative to each other, so that they nullify each other at the resonance circuit, as easily understood. Moreover, the first conductors $L_{e1}$ and $L_{e2}$ are arranged in parallel so as to form a "parallel excitation line," whereby the impedance of the excitation terminals $2a$ and $2b$ is low. This low impedance of the excitation loop circuit makes possible excitation by high frequency (i.e., high speed operation) with low power consumption. When a plurality of parametron elements of this example are arranged in cascade with respect to each of the multiphase excitation terminals (I, II and III) of an exciting source 1 as shown in FIG. 2, leakages to each excitation line ($L_I$, $L_{II}$, or $L_{III}$) from lines excited by other excitation phases are negligible.

Figure 4A:
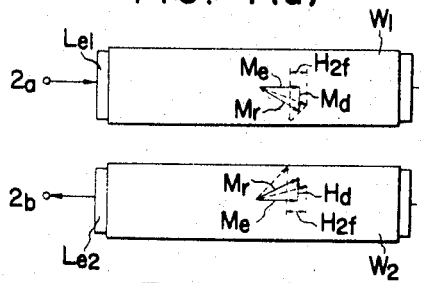
Figure 4B:
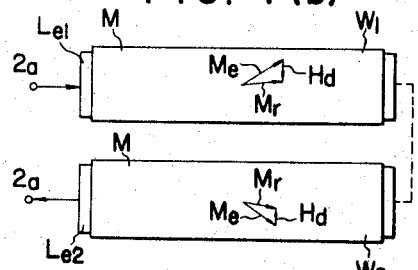

In the case where two conductors are arranged orthogonally and linked to a ferromagnetic film, it generally happens that the two conductors are coupled to each other by rotation of magnetization notwithstanding such orthogonal arrangement of the two conductors. Referring to FIGS. 4(a) and 4(b), application of this phenomena to the parametron element of this invention will be described.

(i) When an easy direction of magnetization is established in the axial direction of each of the first conductors $L_{e1}$ and $L_{e2}$: A magnetization $Me$ established in the easy direction is directed to a resultant magnetization $Mr$ by a D.C. bias magnetic field $Md$. Accordingly, the magnetization $Mr$ rotates in the region shown by dotted line when the excitation magnetic field $H_{2f}$ is applied. Voltages induced to the second conductor $L_0$ (not shown but wound on the films $W_1$ and $W_2$) have opposite phase positions with respect to the films $W_1$ and $W_2$, so that they are substantially at the resonance circuit.

(ii) When an easy direction of magnetization is established in a direction deflected from the axial direction of each of the first conductors $L_{e1}$ and $L_{e2}$ (FIG. 4(b)): It is suitable to employ a film ($W_2$) with an easy direction established in the direction of a right-handed screw and a film ($W_1$) with an easy direction established in the direction of a left-handed screw. Induced voltages are nullified similarly as in the above described case.

Figure 5A:
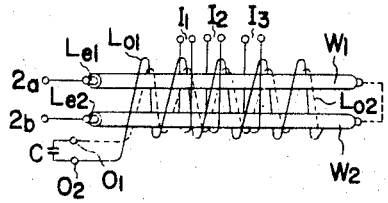
Figure 5B:
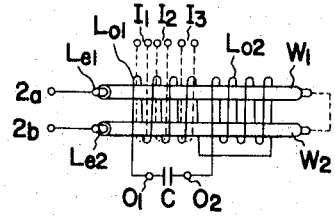
Figure 5C:
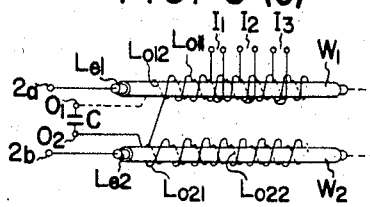
Figure 5D:
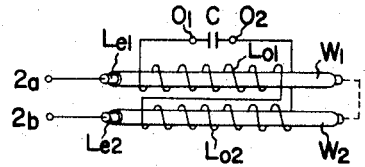
Figure 5E:
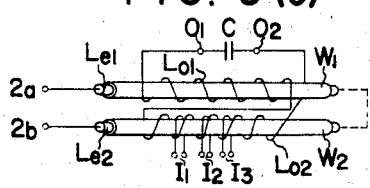
Figure 5F:
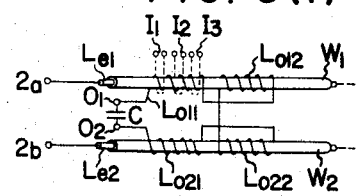
Figure 6A:
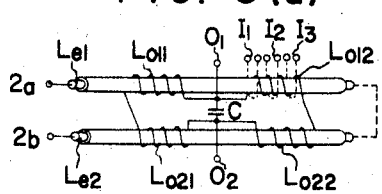
Figure 6B:
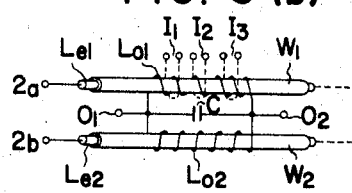

FIGS. 5(a) to 5(f) and 6(a) and 6(b) illustrate other embodiments of this invention. In FIG. 5(a), the second conductor $L_0$ is composed of two laminated coils $L_{01}$ and $L_{02}$ and is so connected in series that the turns of these coils are arranged in reciprocation as shown. Above described cancelling out of induced voltages is advantageously effected in this embodiment. In FIG. 5(b), the second conductor $L_0$ is composed of two divided coils $L_{01}$ and $L_{02}$ which are concurrently wound on the films $W_1$ and $W_2$ and connected in series to each other in the reverse senses. In FIG. 5(c), the second conductor $L_0$ is composed of two divided coils $L_{01}$ and $L_{02}$ which are separately wound on the films $W_1$ and $W_2$, which are separately wound on the films $W_1$ and $W_2$, each of the two coils $L_{01}$ and $L_{02}$ being a laminated coil, the turns of these coils being arranged in reciprocation. In FIG. 5(d), the second conductor $L_0$ is composed of two coils $L_{01}$ and $L_{02}$ separately wound on the films $W_1$ and $W_2$ and connected in series so as to cancel out such induced voltages. In FIG. 5(e), the winding directions of the coils $L_{01}$ and $L_{02}$ are different from each other while other details of arrangement are the same as those of the example shown in FIG. 5(d). The embodiment shown in FIG. 5(e) has the advantage of the fluxes caused by parametrical oscillation being closed in the vicinity of the films $W_1$ and $W_2$. As a result of such substantially closed magnetic circuit of oscillation, this embodiment is almost completely unaffected by external magnetic fields. In FIG. 5(f), the second conductor $L_0$ is composed of two coils $L_{011}$ and $L_{012}$ each wound on the film $W_1$ and two coils $L_{021}$ and $L_{022}$ each wound on the film $W_2$, the coils $L_{011}$ and $L_{012}$ and the coils $L_{021}$ and $L_{022}$ being respectively connected in series in the reverse senses as shown. In embodiments shown in FIGS. 6(a) and 6(b), connected coils ($L_{011}$ and $L_{021}$) and $L_{012}$ and $L_{022}$) or coils $L_{01}$ and $L_{02}$ are connected in parallel to each other at the terminals of the capacitor C.

Figure 7A:
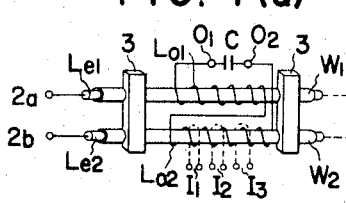
Figure 7B:
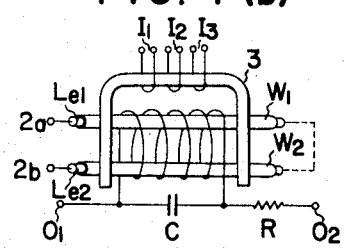

The parametron element shown in FIG. 7(a) or 7(b) has a magnetic substance 3 which is employed for magnetically connecting the films $W_1$ and $W_2$ so as to form a magnetic circuit through which magnetic fluxes of the generated frequency $f_0$ are passed.

Figure 7C:
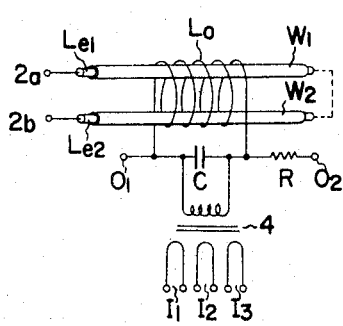

The input means can be coupled to said magnetic circuit as shown in FIG. 7(b). In other cases, the input terminals $I_1$, $I_2$ and $I_3$ can be provided at the primary windings of a transformer the secondary winding of which is connected to the resonance circuit as shown in FIG. 7(c).

The excitation system of the parametron element of this invention is illustrated in FIGS. 8(a) and 8(b). The parallel line system shown in FIG. 8(a) is desirable as described above (FIG. 3), but another excitation system shown in FIG. 8(b) can be employed.

Connection between parametron elements excited by one of other excitation phases is effected as shown in FIG. 9 in which resistances R are employed as coupling resistors for coupling between the resonance circuit of the parametron element excited by the preceding phase and the input means of the parametron element excited by the succeeding phase.

A parametron unit including a plurality of parametron elements can be advantageously constructed in accordance with the present invention. FIGS 10 and 11 illustrate examples of such a unit. In this unit, a plurality of resonance circuits are arranged side by side along the parallelly arranged films $W_1$ and $W_2$ so as to form a plurality of parametron elements $P_1$, $P_2$, $P_3$ ... $P_n$ as shown in FIG. 10. If shields 4 shown by dotted lines are disposed to cover the respective elements, interference among fluxes of respective elements can be extremely reduced so that a stably operatable parametron unit can be provided. FIG. 11 shows one example of an actual parametron unit in which only one resonance circuit ($L_0$ and C) and only one input coil $L_1$ for each unit are shown for simple and comprehensible illustration. In these units, magnetic wires each composed of a straight conductor $L_{e1}$ or $L_{e2}$ and a ferromagnetic film $W_1$ or $W_2$, each of which is deposited on the conductor $L_{e1}$ or $L_{e2}$, are held by a base 5 of insulative material. The magnetic wires are inserted into grooves 6 provided in the base 5 and fixed to the base 5 by a bonding agent. The shield is constructed together with bulkheads 7. As easily understood, other arrangements of parametron elements as shown in FIGS. 5(a) to 6(b) can be employed as elements of this unit.

An actual example of the parametron element is as follows:

the first conductor—beryllium copper (0.5 millimeter diameter), the film—Permalloy film of (1–1.5μ thickness), approximately 20% of Fe, 80% of Ni.

the second conductor: copper wire of 0.1 millimeter diameter.

Since it is obvious that many changes and modifications can be made in the above described details without departing from the nature and spirit of the invention, it is to be understood that the invention is not to be limited to the details described herein except as set forth in the appended claims.

What we claim is:

1. A parametron element, comprising: a pair of hollow tubular thin films of high permeability material arranged in parallel each having an easy direction of magnetization; a pair of first conductors each threaded through said hollow films; a second conductor consisting of a winding wound on said hollow films; tuning means connected to the second conductor to form a parallel resonance circuit having a resonance frequency $f_0$; means for passing an energizing alternating current having a frequency substantially equal to $2f_0$ through the first conductors in reverse direction to each other, thereby to cause voltages of the frequency $2f_0$ induced in the second conductor by the energizing alternating current flowing through the first conductors to nullify each other in the resonance circuit; input means for applying to the resonance circuit at least one information signal having the frequency $f_0$ and either of opposite phase positions in accordance with binary information; and output means for deriving from the resonance circuit an output signal which has the frequency $f_0$ and either of opposite phase positions in accordance with the phase position of the information signal.

2. A parametron element according to claim 1, in which the winding of the second conductor is composed of a coil which is wound on a pair of said hollow films.

3. A parametron element according to claim 1, in which the winding of the second conductor is composed of two coils which are each wound on a pair of said hollow films and connected in series in opposite senses to each other.

4. A parametron element according to claim 1, in which the winding of the second conductor is composed of two coils which are respectively wound on said hollow films substantially in the same configuration.

5. A parametron element according to claim 4, in which the two coils are connected in series.

6. A parametron element according to claim 5, in which each of the two coils is a laminated coil, and the turns of the coils are arranged in reciprocation.

7. A parametron element according to claim 4, in which the two coils are connected in parallel.

8. A parametron element according to claim 1, in which the element is provided with means for magnetically connecting the hollow films so as to form a magnetic circuit through which magnetic fluxes of the frequency $f_0$ are passed.

9. A parametron element according to claim 1, in which the element is provided with means for shielding the element from external magnetic fields.

10. A parametron unit including a plurality of parametron elements, comprising: a pair of hollow tubular thin films of high permeability material arranged in parallel each having an easy direction of magnetization; a pair of first conductors each threaded through said hollow films; a plurality of second conductors each consisting of a winding wound on said hollow films; a plurality of tuning means each connected to form a plurality of resonance circuits each having a resonance frequency $f_0$; means for passing an energizing alternating current having a frequency substantially equal to $2f_0$ through the first conductors in reverse direction to each other, thereby to causes voltages of the frequency $2f_0$ induced in each of the second conductors by the energizing alternating current flowing through the first conductors to nullify each other in each of the resonance circuits; input means for applying, to each of the resonance circuits, at least one information signal having the frequency $f_0$ and either of opposite phase positions in accordance with binary information; output means for deriving from each of the resonance circuits an output signal which has the frequency $f_0$ and either of opposite phase positions in accordance with the phase position of the information signal.

References Cited

UNITED STATES PATENTS 3,348,061  10/1967  Oshima et al. _____ 307—88

JAMES W. MOFFITT, *Primary Examiner.*

U.S. Cl. X.R.

340—174